US012711197B2

(12) United States Patent
Xiao et al.

(10) Patent No.: US 12,711,197 B2
(45) Date of Patent: Aug. 18, 2026

(54) DATA AUGMENTATION METHOD AND RECEIVER

(71) Applicant: GUANGDONG OPPO MOBILE TELECOMMUNICATIONS CORP., LTD., Dongguan (CN)

(72) Inventors: Han Xiao, Dongguan (CN); Wenqiang Tian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 502 days.

(21) Appl. No.: 18/486,345

(22) Filed: Oct. 13, 2023

(65) Prior Publication Data

US 2024/0061905 A1 Feb. 22, 2024

Related U.S. Application Data

(63) Continuation of application No. PCT/CN2021/087599, filed on Apr. 15, 2021.

(51) Int. Cl.
*G06F 18/21* (2023.01)
*H04L 25/02* (2006.01)

(52) U.S. Cl.
CPC ............ *G06F 18/21* (2023.01); *H04L 25/024* (2013.01)

(58) Field of Classification Search
CPC ............................... G06F 18/21; H04L 25/024
USPC ............................................................ 706/12
See application file for complete search history.

(56) References Cited

U.S. PATENT DOCUMENTS

2020/0177418 A1 6/2020 Hoydis et al.
2021/0195206 A1* 6/2021 Hannuksela ......... H04N 19/103
2022/0007084 A1* 1/2022 Aytekin ................... G06N 3/08

FOREIGN PATENT DOCUMENTS

CN 109861942 A 6/2019
CN 110636020 A 12/2019
CN 111510402 A 8/2020
CN 112054863 A 12/2020

OTHER PUBLICATIONS

Luis Perez, The Effectiveness of Data Augmentation in Image Classification using Deep Learning, 2017 (Year: 2017).*
International Search Report, International Application No. PCT/CN2021/087599, mailed Dec. 27, 2021 (17 pages).
AdaNN:Adaptive Neural Network-based Equalizer via Online Semi-supervised Learning, dated Jul. 24, 2019 (10 pages).
European Search Report, European Patent Application No. 21936437.9, mailed May 13, 2024 (29 pages).

* cited by examiner

*Primary Examiner* — Tarek Elchanti
(74) *Attorney, Agent, or Firm* — Ladas & Parry LLP

(57) ABSTRACT

A data enhancement method and a receiver. the method is performed by a receiver and includes performing a data augmentation process for a result obtained by a first basic model of the receiver to obtain a first data augmented training set; performing an online training fine tuning process for the first basic model based on the first data augmented training set to obtain a second basic model; and stopping a loop in response to a loop stopping condition being satisfied.

14 Claims, 5 Drawing Sheets

DATA AUGMENTATION METHOD AND RECEIVER

CROSS REFERENCE TO RELATED APPLICATIONS

The present disclosure is a continuation of International (PCT) Patent Application No. PCT/CN2021/087599 filed on Apr. 15, 2021, the entire contents of which are hereby incorporated by reference in its entirety.

TECHNICAL FIELD

The present disclosure relates to a field of communications, and in particular to a data augmentation method and a receiver.

BACKGROUND

Modules involved in current 5G New Radio (NR) communication systems, such as a coding module, a modulation module, a channel estimation module, and an interference cancellation module, etc., are modular implementations. These independent modules operate in coordination and are combined to form a complete wireless communication system in which a signal reception recovery is divided into multiple sub problems to solve. However, when a complex problem is disassembled and refined into several independent problems as described above, an overall performance may be correspondingly limited. A goal of an overall communication system is to be able to transmit more information more accurately in a shorter time. However, after the communication system is disassembled, a direct goal of each sub module is no longer an overall goal of the communication system described above. For example, an objective of the channel estimation module is to make a better estimation for a channel, and an objective of a channel coding module is to ensure a reduced symbol error rate transmission. In this way, with each module under a local optimal design thereof, the overall performance of the communication system finally achieved may have a difference from an overall global optimal goal.

SUMMARY OF THE DISCLOSURE

Embodiments of the present disclosure provide a data augmentation method and a receiver.

According to a first aspect of the embodiments of the present disclosure, a data augmentation method is provided. The method is performed by a receiver and includes performing a data augmentation process for a result obtained by a first basic model of the receiver to obtain a first data augmented training set; performing an online training fine tuning process for the first basic model based on the first data augmented training set to obtain a second basic model; and stopping a loop in response to a loop stopping condition being satisfied.

According to a second aspect of the embodiments of the present disclosure, a receiver is provided and includes a memory, storing executable program codes; and a processor, coupled to the memory; wherein the processor is configured to perform a data augmentation process for a result obtained by a first basic model of the receiver to obtain a first data augmented training set; perform an online training fine tuning process for the first basic model based on the first data augmented training set to obtain a second basic model; and stop a loop in response to a loop stopping condition being satisfied.

According to a third aspect of the embodiments of the present disclosure, a computer-readable storage medium is provided and includes instructions, wherein when the instructions are run on a processor, the processor is caused to perform the method according to the first aspect.

DETAILED DESCRIPTION

Technical schemes of the embodiments of the present disclosure will be described below in conjunction with accompanying drawings in the embodiments of the present disclosure. Apparently, described embodiments are a part but not all of the embodiments of the present disclosure. Other embodiments obtained by one of ordinary skill in the related art based on the embodiments of the present disclosure without creative labor shall all fall into the scope of the present disclosure.

Terms involved in the embodiments of the present disclosure are briefly described in the following.

1. A Description for the Receiver in the Current Wireless Communication System

Figures 1A, 1B, 1C, 1D:
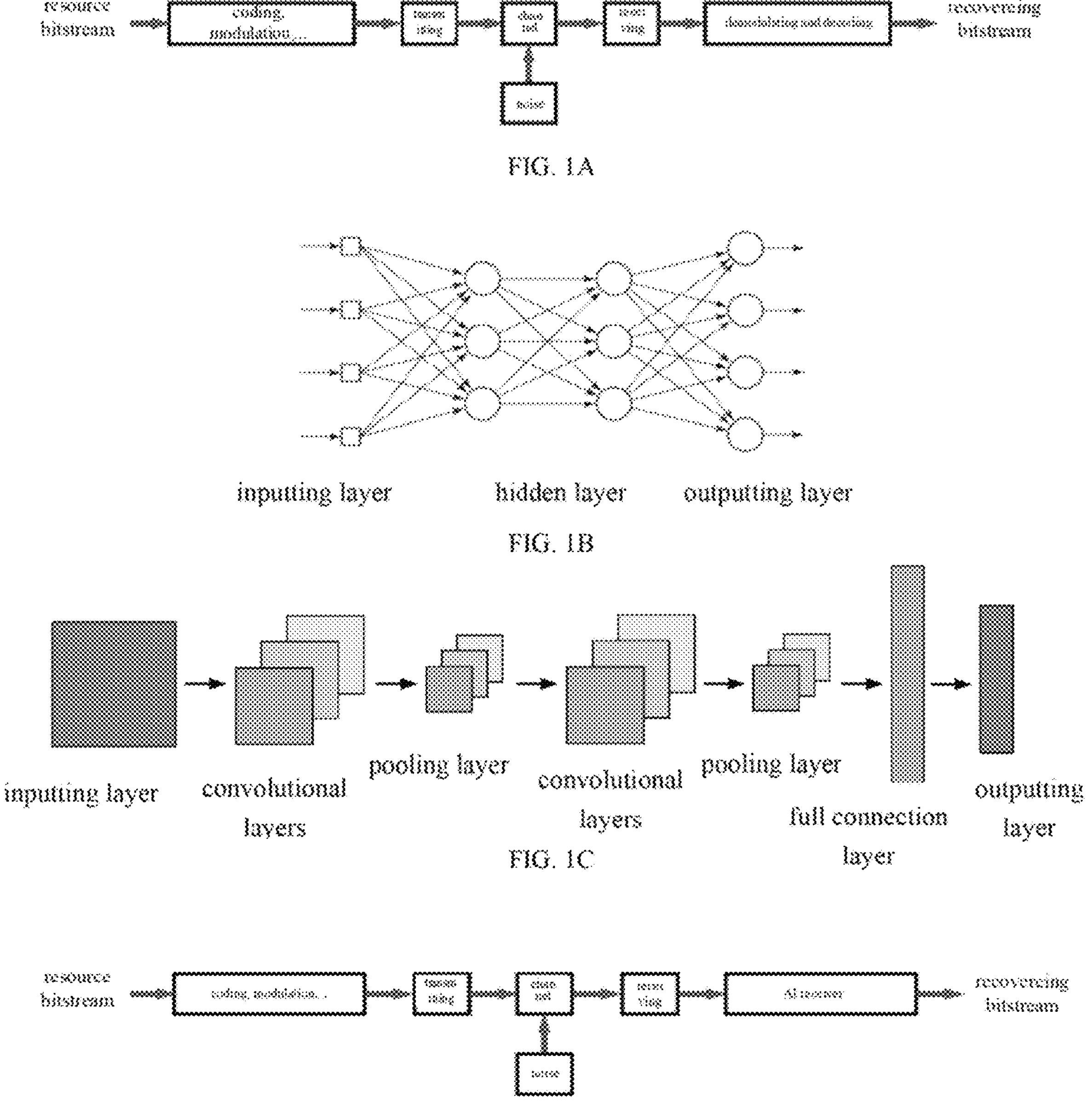
FIG. 1A is a schematic operating flowchart of a current wireless communication system.
FIG. 1B is a schematic view of a basic structure of a neural network.
FIG. 1C is a schematic view of a basic structure of a convolutional neural network.
FIG. 1D is a schematic view of a practical framework of an AI receiver.

In the wireless communication system, a basic operating flow is that a transmitter performs an operation such as coding, modulating, etc., a source at a transmitting side to form a to-be-transmitted transmitting signal. The transmitting signal is transmitted to a receiving side through a wireless spatial channel. The receiving side performs an operation such as, decoding, decrypting and demodulating, etc., received information, and finally recovers source information. As shown in FIG. 1A, FIG. 1A is a schematic operating flowchart of a current wireless communication system.

In the above process, modules such as the coding module, the modulation module, a decoding module, a demodulation module, etc., and other modules not enumerated, such as a resource mapping module, a per-coding module, the channel estimation module, the interference cancellation module, etc., are implemented and designed separately. The complete wireless communication system is formed by integrating each independent module.

2. Neural Network

In recent years, an artificial intelligence research represented by the neural network has achieved significant effect in many fields, which will also play an important role in production life of the people for a long time in the future.

The basic structure of a simple neural network includes an inputting layer, a hidden layer, and an outputting layer. As shown in FIG. 1B, FIG. 1B is a schematic view of the basic structure of the neural network. The inputting layer is configured to receive data, the hidden layer is configured to process the data, and a final result is generated in the outputting layer. Each node represents a processing unit, which may be considered as a simulation of a neuron. Multiple neurons form a layer of neural network, and multiple layers of information transfer and processing construct a whole neural network.

With a continuous development of a neural network research, a neural network deep learning algorithm is proposed in recent years. More hidden layers are introduced, the neural network having multiple hidden layers is trained layer by layer to perform feature learning, which significantly improves a learning capability and a processing capability of the neural network to be widely applied in an aspect such as a mode recognition, a signal processing, a optimal combination, an anomaly detection, etc.

Similarly, with the development of deep learning, Convolutional Neural Networks (CNNs) are also further investigated. The basic structure of a convolutional neural network includes an inputting layer, multiple convolutional layers, multiple pooling layers, a full connection layer, and an outputting layer. As shown in FIG. 1C, FIG. 1C is a schematic view of a basic structure of a convolutional neural network. The convolutional layers and the pooling layer are introduced to effectively control a dramatic increase of network parameters, limit the number of parameters, and exploit a characteristic of a local structure, which improves robustness of the algorithm.

3. An Existing End-to-End Receiver Scheme Based on the Neural Network

In view of great success of the Artificial Intelligence (AI) technology in an aspect such as computer vision, nature language processing, etc., the field of communications begins to try to employ the AI technology to seek new technical ideas to solve technical difficulties limited by traditional methods, e.g., the deep learning. By introducing an AI-based solution in the process of designing the receiver and employing the neural network to achieve an overall model design, a better performance gain of the receiver may be obtained. As shown in FIG. 1D, FIG. 1D is a schematic view of a practical framework of an AI receiver. That is, a signal processing flow of a traditional receiver is directly replaced by the neural network. An input of an end-to-end AI receiver network is a signal received by a receiving end, and an output thereof is a recovered bitstream. Meanwhile, a network model structure inside the AI receiver may be designed flexibly.

The modules involved in the current 5G NR communication systems, such as the coding module, the modulation module, the channel estimation module, and the interference cancellation module, etc., are the modular implementations. These independent modules operate in coordination and are combined to form the complete wireless communication system in which the signal reception recovery is divided into multiple sub problems to solve. However, when the complex problem is disassembled and refined into several independent problems as described above, the overall performance may be correspondingly limited. The goal of the overall communication system is to be able to transmit more information more accurately in the shorter time. However, after the communication system is disassembled, the direct goal of each sub module is no longer the overall goal of the communication system described above. For example, the objective of the channel estimation module is to make the better estimation for the channel, and the objective of the channel coding module is to ensure the reduced symbol error rate transmission. In this way, with each module under the local optimal design thereof, the overall performance of the communication system finally achieved may have a difference from the overall global optimal goal. Meanwhile, since a modular division is an empirical division since the evolution of communication systems, it is also difficult to say that the current modular division is better.

On the other hand, for the currently existing end-to-end receiver scheme based on the neural network, training data is obtained generally through generating a source bitstream vector first, and secondly obtaining a receiving signal through an operation such as, coding and modulation of the transmitting end, and passing through the channel, etc. The receiving signal is configured to be an input of an AI receiver model and the source bitstream vector is configured to be an output to train the model. However, since a bitstream vector is usually longer, a spanned vector space is extremely large. For example, a 2048-bit data-stream vector space includes 2^2048 vectors. Meanwhile, due to complexity and variability of a real channel environment, a module obtained by training a training set consisting of a limited number of acquired channel manufacturing receiving signals may frequently fail to be well generalized in practical applications. Although the above problem may be solved by augmenting the local training set, the training set is difficult to encompass all cases due to a larger data bitstream vector space and a more complex channel environment. In addition, convergence difficulty of the training is also significantly increased as a result of the training set being overlarge.

The receiver in the embodiments of the present disclosure may be a network device or a terminal device. The terminal device may be referred to as a user equipment (UE), an access terminal, a user unit, a user station, a mobile station, a remote station, a remote terminal, a mobile device, a user terminal, a terminal, a wireless communication device, a user agent, or a user apparatus, etc.

The terminal device may be a STATION (ST) in WLAN, or may be a cellular phone, a cordless phone, a session initiation protocol (SIP) phone, a wireless local loop (WLL) station, a personal digital assistant (PDA), a handheld device with a wireless communication capability, a computing device, or other processing devices connected to a wireless modem, an in-vehicle device, a wearable device, a terminal device in a next generation communication system such a NR network, or a terminal device in a future evolved public land mobile network (PLMN), or the like.

In the embodiments of the present disclosure, the terminal device may be deployed on land which includes indoor or outdoor, handheld, wearable, or vehicle-mounted cases. The terminal device may also be deployed on water (e.g., a ship, etc.), and may also be deployed in the air (e.g., on an aircraft, a balloon, or a satellite, etc.).

In the embodiments of the present disclosure, the terminal device may be a Mobile Phone, a Pad, a computer with a wireless transceiving function, a virtual reality (VR) terminal device, an augmented reality (AR) terminal device, a wireless terminal device under an industrial control, a wireless terminal device in self driving, a wireless terminal devices in a remote medical, a wireless terminal device in a smart grid, a wireless terminal devices in transportation safety, and a wireless terminal device in a smart city or a wireless terminal device in a smart home, etc.

As an example, not a limitation, in the embodiments of the present disclosure, the terminal device may also be the wearable device. The wearable device may also be referred to as a wearable smart device, which is a general term of wearable devices obtained by intelligently designing and developing daily wears, such as glasses, gloves, watches, clothing, and shoes, by means of wearable techniques. The wearable devices are directly worn on a body or integrated into the clothing or an accessory of the user as a portable device. The wearable devices are more than hardware devices, may also achieve powerful functions thereof through software supports, data interactions, and cloud interactions. The wearable smart device in a broad sense includes a device having full features, a large size, and capable of achieving entire or partial functions independent of a smartphone, e.g., a smart watch, or smart glasses, etc., and a device only concentrating on a particular category of application function and required to cooperate with other devices such as the smartphone, e.g., various smart bracelets configured to monitor signs, a smart jewelry, or the like.

In the embodiments of the present disclosure, the network device may be a device configured to communicate with the terminal device. The network device may be an Access Point (AP) in the WLAN, a base transceiver station (BTS) in a GSM or CDMA system, or a NodeB (NB) in a WCDMA system, or an evolutional NodeB (eNB or eNodeB) in the LTE system, or may be a relay station, the access point, the in-vehicle device, the wearable device. and a network device (gNB) in the NR network, or a network device in the future evolved PLMN network, or a network device in a NTN network.

As an example, not a limitation, in the embodiments of the present disclosure, the network device may have a mobile characteristic. For example, the network device may be a mobile device. In an embodiment, the network device may be a satellite, a balloon station. For example, the satellite may be a Low Earth Orbit (LEO) satellite, a medium earth orbit (MEO) satellite, a geostationary earth orbit (GEO) satellite, a High Elliptical Orbit (HEO) satellite, etc. In an embodiment, the network device may also be a base station installed on a location such as the land, the water, etc.

In the embodiments of the present disclosure, the network device may provide service for a cell. The terminal device communicates with the network device through a transmission resource (e.g., a frequency domain resource, or in other words, a spectrum resource) employed by the cell. The cell may be a cell corresponding to the network device (such as, the base station). The cell may belong to a macro base station or a base station corresponding to a small cell. The small cell herein may include a Metro cell, a Micro cell, a Pico cell, a Femto cell, etc. These small cells have characteristics of a small coverage area and a low transmission power, and are suitable to provide a high-speed data transmission service.

Figures 2, 3, 4A:
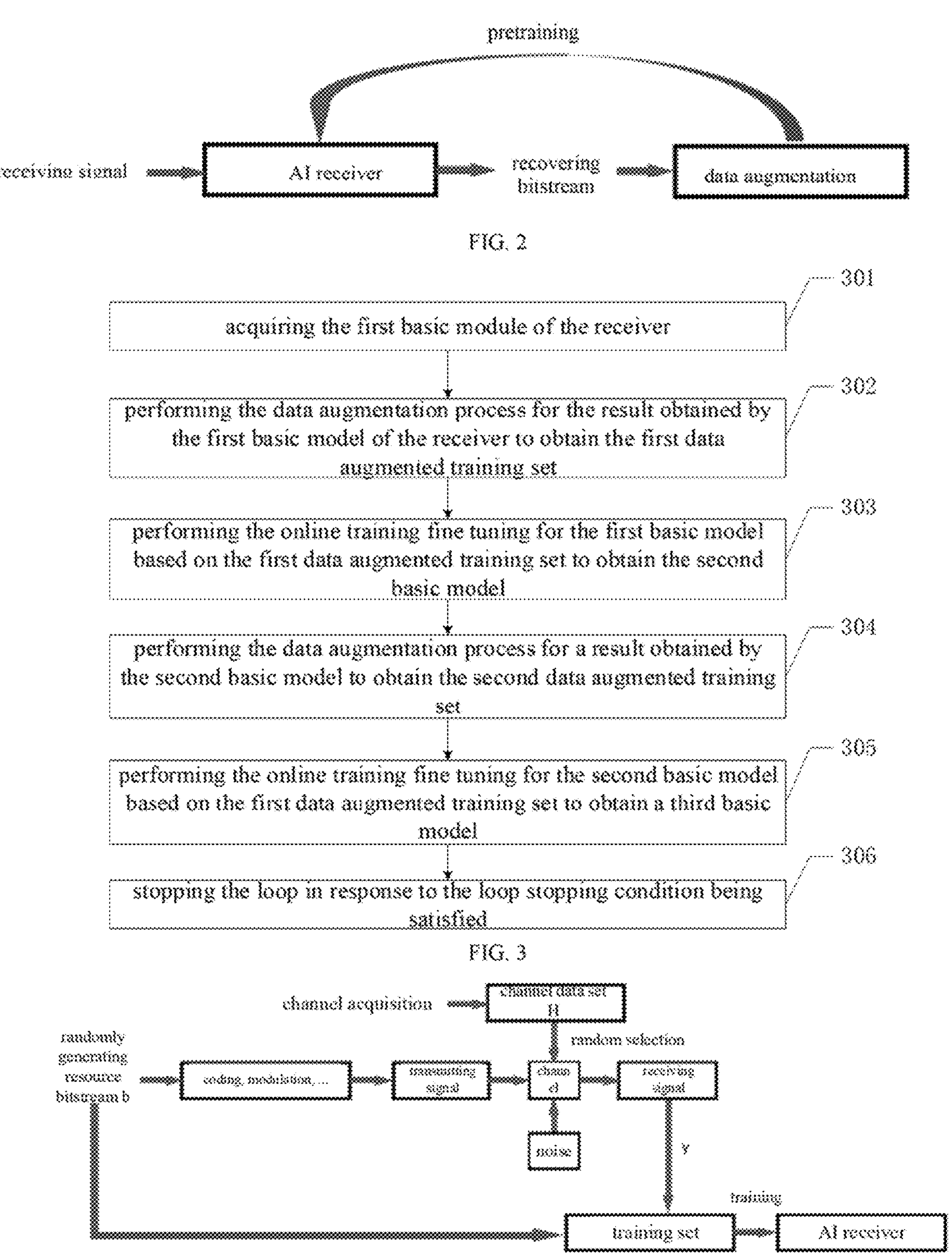
FIG. 2 is a schematic diagram of augmenting a wireless communication system AI receiver according to some embodiments of the present disclosure.
FIG. 3 is a schematic view of a data augmentation method according to an embodiment of the present disclosure.
FIG. 4A is a schematic view of a local pretraining phase according to some embodiments of the present disclosure.

In the embodiments of the present disclosure, the above problem is solved by a method of online learning to augment wireless communication system AI receiver. As shown in FIG. 2, the method may include the following phases.

(1) employing an existing data set to perform a module pretraining and obtaining a basic AI receiver module.

(2) performing a data augmentation process for a result reasoned through a current module in an actual application, and performing an online training fine tuning process for a basic module with a small data set and a small step.

(3) Re-reasoning through a fine-tuned model and obtaining a more accurate receiving bitstream.

(4) When it is necessary, repeating (2) and (3) until a reception accuracy satisfied requirements.

In the embodiments of the present disclosure, performing the data augmentation process for a result obtained by a first basic model of the receiver to obtain a first data augmented training set; performing the online training fine tuning process for the first basic model based on the first data augmented training set to obtain a second basic model; performing the data augmentation process for a result obtained by the second basic model to obtain a second data augmented training set; performing the online training fine tuning process for the second basic model based on the first data augmented training set to obtain a third basic model; and stopping a loop in response to a loop stopping condition being satisfied. The loop stopping condition herein may be understood to be that an accuracy of the basic model of the receiver, such as the number of loops, an accuracy of a result obtained based on the basic module of the receiver, or the like, has met requirements of a user.

The technical schemes of the present disclosure are further described below in a manner of embodiments. As shown in FIG. 3, FIG. 3 is a schematic view of a data augmentation method according to an embodiment of the present disclosure. The method is performed by the receiver and includes operations S301-S306.

In an operation 301, the method may include acquiring the first basic module of the receiver.

It may be appreciated that a receiving bitstream vector is configured to perform a data augmentation online training when a channel variation is relatively smooth and stable. For example, when channel data employed by the training set may well generalized a channel in a real application, an influence of a channel fluctuation may be neglected. Since the space spanned by the source bitstream vector is larger, the training set may not be well generalized to all vector spaces and has a receiving and reasoning error existed in a receiving and reasoning phase in the actual application. In this case, an augmentation scheme may consider to perform the data augmentation process through an imperfect receiving bitstream, perform an online fine tuning for a pretrained receiver through an augmented receiving bitstream, and further perform the re-reasoning and receiving processes to improve the performance of the receiver in a current reception. That is, the online training fine tuning is performed for the receiver for each reception.

In some embodiments, the acquiring the first basic module of the receiver may include acquiring a channel set H; generating a source bitstream b; obtaining a receiving signal y based on the channel set H and the source bitstream b; obtaining a first training set based on the source bitstream b and the receiving signal y; and performing a pretraining for the first training set and obtaining the first basic module.

In an embodiment, the first training set includes a plurality of {b, y} samples.

In some embodiments, the receiver includes the terminal device or the network device.

A local pretraining phase in the present disclosure may include several operations, i.e., a channel acquisition, a data generation, and a model training. For example, As shown in FIG. 4A, FIG. 4A is a schematic view of the local pretraining phase according to some embodiments of the present disclosure. The local pretraining phase is illustrated in conjunction with FIG. 4A and includes the following operations.

(1) Channel acquisition:

Acquiring channel information of channels within a coverage range of an adaptive cell and acquiring the channel set H.

(2) Data generation:

The data generation may include generating a bitstream, coding and modulation, transmitting a signal, noise processing, a channel selection, generating a receiving signal, and forming a training set, or the like. Subsequently, the signal is transmitted and the noise processing is performed, and the receiving signal y is generated based on acquired channels. A {b, y} generated one time is taken as one sample, and multiple samples form a training data set.

(3) Model training: pretraining a designed module through a generated training data set and obtaining the basic module of the AI receiver.

It is to be noted that the operation 301 is an alternative operation.

In an operation 302, the method includes performing the data augmentation process for the result obtained by the first basic model of the receiver to obtain the first data augmented training set.

In an operation 303, the method includes performing the online training fine tuning process for the first basic model based on the first data augmented training set to obtain the second basic model.

In some embodiments, the operation of performing the data augmentation process for the result obtained by the first basic model of the receiver to obtain the first data augmented training set may include acquiring a first receiving signal; inputting the first receiving signal into the first basic model of the receiver to obtain a first bitstream; and performing the data augmentation process for the first bitstream to obtain a second bitstream.

The operation of performing the online training fine tuning process for the first basic model based on the first data augmented training set to obtain the second basic model may include performing the online training fine tuning process for the first basic model based on a second bitstream to obtain the second basic model.

It can be understood that the first receiving signal is an actually received signal.

In some embodiments, the operation of performing the data augmentation process for the first bitstream to obtain a second bitstream may include selecting a first target bitstream from the first bitstream (e.g., selecting 1 bit every 9 bits), performing a binary process and obtaining a first perturbation bit vector set; and obtaining a second training set based on the first perturbation bit vector set and a first receiving signal set. The first receiving signal set is obtained based on the first perturbation bit vector set. In an embodiment, receiving signals in the first receiving signal set are reference receiving signals obtained by simulation, and may be stored in a local.

An operation of performing the online training fine tuning process for the first basic model based on a second bitstream to obtain the second basic model may include performing the online training fine tuning process for the first basic model based on the second training set to obtain the second basic model.

In an embodiment, the first receiving signal set is a receiving signal set obtained based on the first perturbation bit vector set and the channel set H.

Figures 4B, 5:
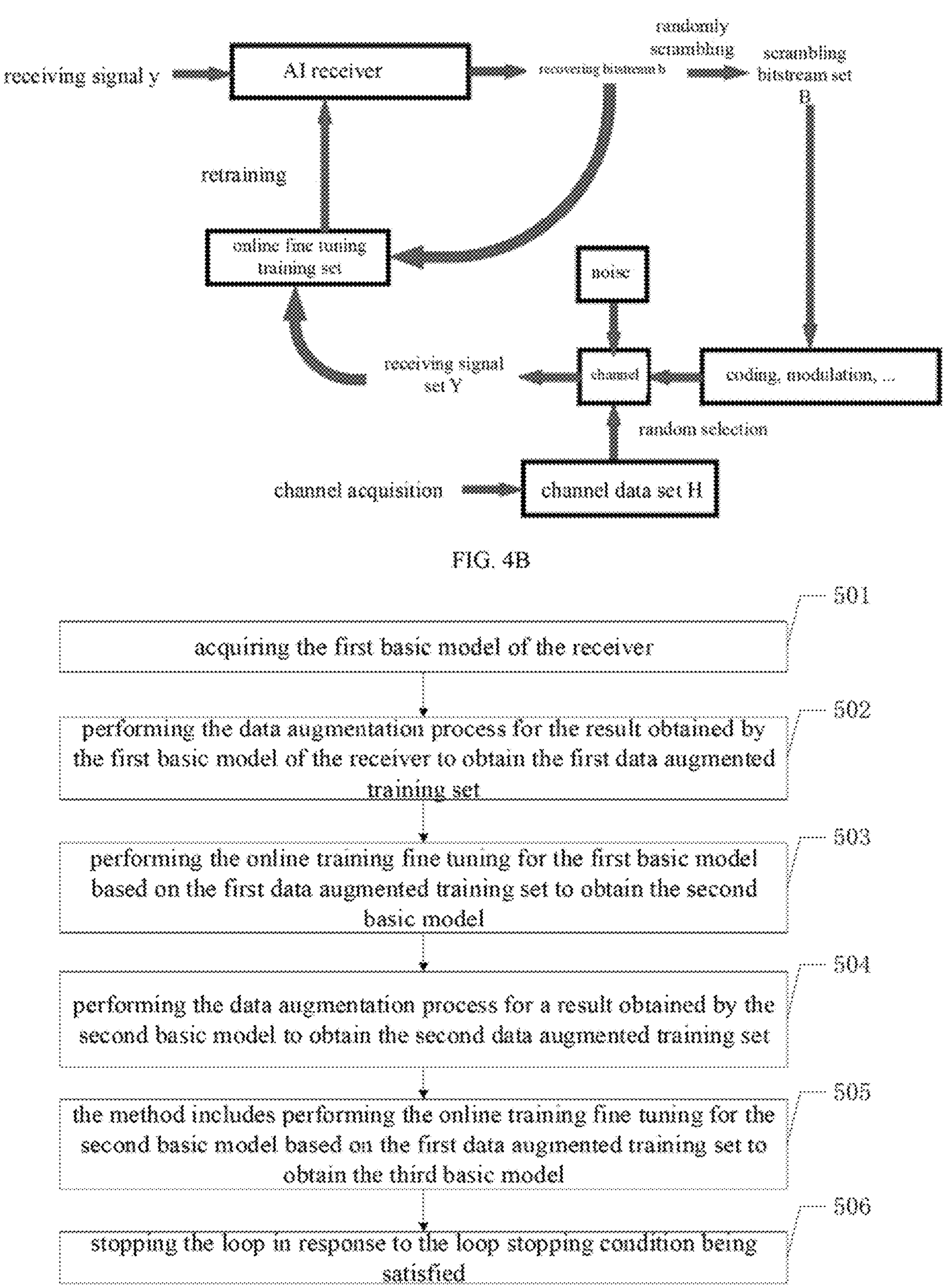
FIG. 4B is a schematic view of a reception phase of a receiving end in an actual application according to some embodiments of the present disclosure.
FIG. 5 is a schematic view of the data augmentation method according to another embodiment of the present disclosure.

For example, as shown in FIG. 4B, FIG. 4B is a schematic view of a reception phase of a receiving end in the actual application according to some embodiments of the present disclosure. The receiving phase may include an operation such as acquiring the receiving signal, recovering a bitstream, generating a perturbation bitstream set, the coding and modulation, the noise processing, the channel acquisition, the channel selection, generating the receiving signal set, generating an online fine tuning training set, or the like.

An example is illustrated in combination with FIG. 4B. An actual receiving signal y1 is inputted into a pretrained AI receiver to reason to obtain a bitstream b1. The bitstream b1 is not an ideal reception and may have some wrong bits. A randomized scramble is performed for a small part of bits of the bitstream b1. For example, a randomized binary resetting is performed for bits at 10% random positions and n numbers of perturbation bit vectors consisting of b1*s* are obtained to form a set B={b_1, . . . , b_n}. The receiving end employs the perturbation bit vector set B through signal processing operations such as coding and modulation, etc., which are the same as those of the transmitting end, an acquired channel set H, and a noise generating receiving signal set Y. A fine tuning with fewer steps is performed for a pretrained AI receiver module. Taking a speed of an online fine-tuning training into account, the number of fine tuning steps and a size of a fine tuning training set may be parameter set according to a requirement of the receiver for a reception delay. Furthermore, the actual receiving signal y1 is inputted again into an online fine tuning trained AI receiver module for reasoning and receiving, to obtain an updated bitstream b2. The bitstream b2 is randomized for a small part of bits . . . , until the loop stopping condition is satisfied. The loop stopping condition may be parameter preset according to a requirement of the receiver for a delay.

In an operation 304, the method includes performing the data augmentation process for a result obtained by the second basic model to obtain the second data augmented training set.

In an operation 305, the method includes performing the online training fine tuning process for the second basic model based on the first data augmented training set to obtain a third basic model.

In some embodiments, the operation of performing the data augmentation process for the result obtained by the second basic model to obtain the second data augmented training set may include inputting the first receiving signal into the second basic model to obtain a seventh bitstream; and performing the data augmentation process for the seventh bitstream to obtain an eighth bitstream.

The operation of performing the online training fine tuning process for the second basic model based on the first data augmented training set to obtain a third basic model may include performing the online training fine tuning process for the second basic module based on the eighth bitstream to obtain a third basic module.

In some embodiments, an operation of performing the data augmentation process for the seventh bitstream to obtain an eighth bitstream may include selecting a second target bitstream from the seventh bitstream, performing the binary process and obtaining a second perturbation bit vector set; and obtaining a fifth training set based on the second perturbation bit vector set and a second receiving signal set. The second receiving signal set is obtained based on the second perturbation bit vector set. In an embodiment, receiving signals in the second receiving signal set are reference receiving signals obtained by simulation, and may be stored in the local.

An operation of performing the online training fine tuning process for the second basic module based on the eighth bitstream to obtain a third basic module may include performing the online training fine tuning process for the second basic module based on the fifth training set to obtain the third basic module.

In an embodiment, the second receiving signal set is a receiving signal set obtained based on the second perturbation bit vector set and the channel set H.

It is to be noted that the operations 304 and 305 are alternative operations.

In an operation 306, the method may include stopping the loop in response to the loop stopping condition being satisfied.

In some embodiments, the operation of stopping the loop in response to the loop stopping condition being satisfied may include stopping the loop in response to the symbol error rate of a third bitstream being less than a preset symbol error rate threshold, and/or, the number of loops being equal to a preset number threshold. The third bitstream is an updated bitstream obtained through inputting the first receiving signal into the second basic module, or the third bitstream is an updated bitstream obtained through inputting the first receiving signal into the third basic module.

It can be appreciated that the operations 302 and 303 forms one loop, and the operations 304 and 305 forms another loop.

In an embodiment, the loop stopping condition includes the number of loops. When the operations 304 and 305 are alternative, accordingly the loop stopping condition may be looping once. That is, after the operation 303 is executed and completed, the loop is stopped. The second basic module obtained is a to-be-employed basic module of the AI receiver.

When the operations 304 and 305 are not alternative operations, accordingly the loop stopping condition may be looping twice. That is, after the operation 305 is executed and completed, the loop is stopped. The third basic module obtained is the to-be-employed basic module of the AI receiver.

In an embodiment, the loop stopping condition includes an updated symbol error rate of the bitstream being less than the preset symbol error rate threshold. In this case, it is required to determine whether an updated bitstream symbol error rate obtained after the actual receiving signal is inputted into the online training fine tuned basic module each time is less than the preset symbol error rate threshold. When the updated bitstream symbol error rate is less than the preset symbol error rate threshold, the loop stopping condition is satisfied and a corresponding online training fine tuned basic module is the to-be-employed basic module. When the updated bitstream symbol error rate is greater than or equal to the preset symbol error rate threshold, a corresponding online training fine tuned basic module is performed the online training fine tuning again . . . , until the updated bitstream symbol error rate reaches the preset symbol error rate threshold.

In the embodiments of the present disclosure, the method includes receiving the first receiving signal; inputting the first receiving signal into the first basic module of the receiver to obtain the first bitstream; performing the data augmentation process for the first bitstream to obtain the second bitstream; performing the online training fine tuning process for the first basic module based on the second bitstream to obtain the second basic module; and stopping the loop in response to the loop stopping condition being satisfied. In the embodiments of the present disclosure, a neural network module is configured to replace the function of a modular scheme in a traditional communication receiver. In particular, in the present disclosure, it is considered that the receiver in the actual application employs an online training learning method to enable a receiver module to be kept updated in real time or periodically based on a time-varying feature such as, a receiving bitstream feature, which ensures an environmental tracking auto-adaptive adjustment of the model in actual application, and improves an adaptation generalization capability. In this way, a reception recovery accuracy of an AI-based communication receiver for an information bitstream may be improved.

As shown in FIG. 5, FIG. 5 is a schematic view of the data augmentation method according to another embodiment of the present disclosure. The method is performed by the receiver and includes operations 501-506.

In an operation 501, the method may include acquiring the first basic model of the receiver.

Figure 6A:
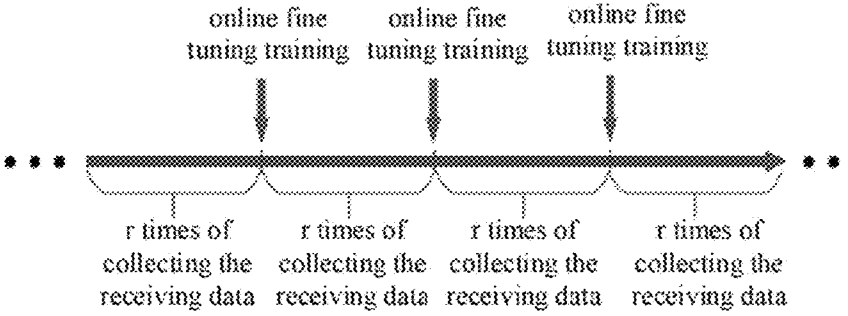
FIG. 6A is a schematic view of performing one online training fine-tuning process every r times of receptions according to some embodiments of the present disclosure.

It may be appreciated that when a channel variation fluctuation reaches a level and affects the performance of the receiver, a data augmentation online training may be performed through performing an error correction process of channel decoding for the receiving bitstream vector. That is, the AI receiver considers to implement functions other than channel decoding only through the neural network. In order to obtain a final recovering bitstream, a traditional channel decoding is required to be performed for an output of the receiver. In addition, AI considers to perform one online training fine tuning every r times of receptions, and a value of r may be selected based on a condition such as, a variation level of an actual channel, an online training fine tuning delay requirement, a channel decoding error correction capability, etc. Before the fine tuning training, signals received in the r times of receptions and a recovered bitstream are configured as training base for a current online fine tuning. As shown in FIG. 6A, FIG. 6A is a schematic view of performing one online training fine-tuning process every r times of receptions according to some embodiments of the present disclosure. In FIG. 6A, after performing r times of collecting receiving data, one online training fine tuning is performed. In subsequence, after another r times of collecting the receiving data, another online training fine tuning is performed, and so on.

In some embodiments, the operation of acquiring the first basic model of the receiver may include acquiring the channel set H; generating the source bitstream b; performing a channel coding process for the source bitstream b and obtaining a coded bitstream b'; obtaining the receiving signal y based on the channel set and the coded bitstream; obtaining a fourth training set based on the r coded bitstream b' and the receiving signal y; and performing the pretraining for the fourth training set and obtaining the first basic module.

In an embodiment, the fourth training set includes a plurality of {b', y} samples.

In some embodiments, the receiver includes the terminal device or the network device.

Figure 6B:
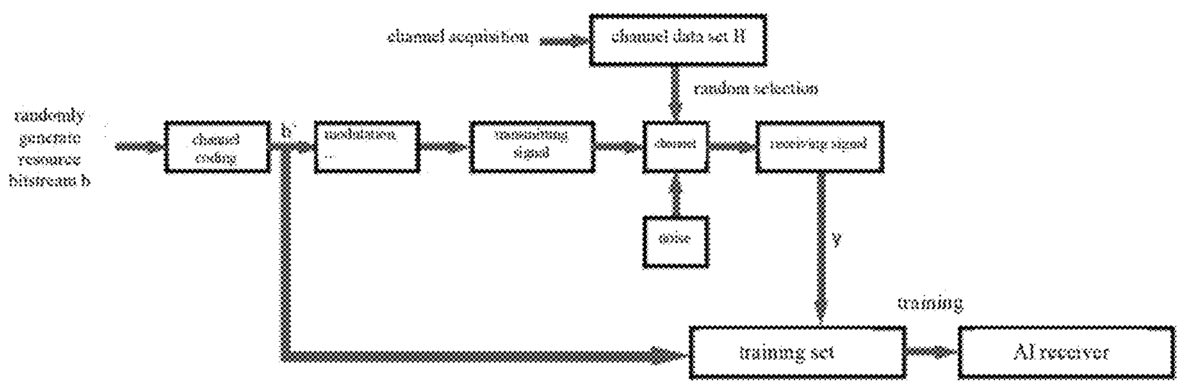
FIG. 6B is another schematic view of the local pretraining phase according to some embodiments of the present disclosure.

The local pretraining phase in the present disclosure may include several operations, i.e., the channel acquisition, the data generation, and the model training. For example, As shown in FIG. 6B, FIG. 6B is another schematic view of the local pretraining phase according to some embodiments of the present disclosure.

is a schematic view of the local pretraining phase according to some embodiments of the present disclosure. The local pretraining phase is illustrated in conjunction with FIG. 4A and includes the following operations.

The local pretraining phase of the present disclosure may comprise several steps of channel acquisition, data generation, and model training. Exemplarily, as shown in FIG. 6B, another schematic diagram of the local pretraining phase in an embodiment of the present disclosure, illustrated in conjunction with FIG. 6B, includes the following steps:

(1) Channel acquisition: acquiring the channel information of the channels within the coverage range of the adaptive cell and acquiring the channel set H.

(2) Data generation:

The data generation may include generating the bitstream, the channel coding, the modulation, transmitting the signal, the noise processing, the channel selection, generating the receiving signal, and forming the training set, or the like.

For example, a coded bitstream b' obtained by performing the channel coding process for a random source bitstream vector b generated each time. Further, the receiving signal is obtained through a traditional transmitter operation such as the modulation. Subsequently, the signal is transmitted and the noise processing is performed, and the receiving signal y is generated based on the acquired channels. A {b', y} generated one time is taken as one sample, and multiple samples form a training data set.

(3) Model training: pretraining the designed module through an existing training data set and obtaining the basic module of the AI receiver.

It is to be noted that the operation 501 is an alternative operation.

In an operation 502, the method includes performing the data augmentation process for the result obtained by the first basic model of the receiver to obtain the first data augmented training set.

In an operation 503, the method includes performing the online training fine tuning process for the first basic model based on the first data augmented training set to obtain the second basic model.

In some embodiments, the operation of performing the data augmentation process for the result obtained by the first basic model of the receiver to obtain the first data augmented training set may include acquiring a second receiving signal (e.g., an actual receiving signal of the $t^{th}$ time); inputting the second receiving signal into the first basic model to obtain a fourth bitstream; preforming a channel decoding process for the fourth bitstream an obtaining a fifth bitstream; performing the channel coding process for the fifth bitstream and obtaining a recoded sixth bitstream; and obtaining a third training set based on the sixth bitstream and the second receiving signal.

The operation of performing the online training fine tuning process for the first basic model based on the first data augmented training set to obtain the second basic model may include performing the online training fine tuning process for the first basic model based on the third training set to obtain the second basic model, in response to times of receiving the signals satisfying a reception time threshold.

It can be understood that the second receiving signal is an actually received signal.

In an operation 504, the method includes performing the data augmentation process for a result obtained by the second basic model to obtain the second data augmented training set.

In an operation 505, the method includes performing the online training fine tuning process for the second basic model based on the first data augmented training set to obtain the third basic model.

In some embodiments, the operation of performing the data augmentation process for the result obtained by the second basic model to obtain the second data augmented training set may include acquiring a third receiving signal (e.g., an actual receiving signal of the $(t+1)^{th}$ time); inputting the third receiving signal into the first basic model to obtain a tenth bitstream; preforming the channel decoding process for the tenth bitstream and obtaining a eleventh bitstream; performing the channel coding process for the eleventh bitstream and obtaining a recoded twelfth bitstream; and obtaining a sixth training set based on the twelfth bitstream and the third receiving signal.

The operation of performing the online training fine tuning process for the second basic model based on the first data augmented training set to obtain the third basic model may include performing the online training fine tuning process for the first basic model based on the sixth training set to obtain the third basic model, in response to the times of receiving the signals satisfying the reception time threshold.

Figure 6C:
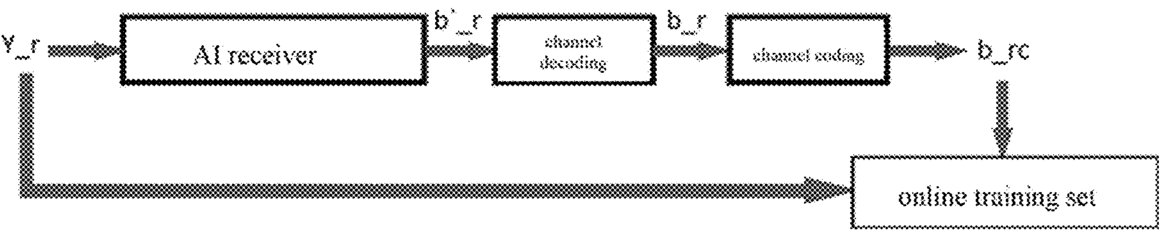
FIG. 6C is a schematic view of an acquisition phase of receiving and online training fine tuning a data set according to some embodiments of the present disclosure.

As shown in FIG. 6C, FIG. 6C is a schematic view of an acquisition phase of receiving and online training fine tuning a data set according to some embodiments of the present disclosure. The acquisition phase of the receiving and online training fine tuning the data set is illustrated in combination with FIG. 6C.

The acquisition phase mentioned above may include an operation such as, the channel decoding, the channel coding, generating an online training set, etc.

For example, for the $t^{th}$ reception, a receiving signal y_r is inputted into a pretrained AI receiver network model, and a bit vector b'_r is obtained by reasoning. The bitstream b'_r is inputted into a conventional channel decoding unit to be performed the channel decoding process, and the error correction is performed for a received bitstream to obtain a final receiving bitstream b_r of the current reception. The channel coding process is re-performed for the final receiving bitstream b_r and a recoded bit vector b_rc is obtained. A sample {y_r, b_rc} consisting of the receiving signal y_r and the recoded bit vector b_rc is placed into an online training fine tuning data set. A reception time index is updated to t=t+1. The $(t+1)^{th}$ reception operation is performed until t is equal to the maximum reception time r, and r is an integer greater than 0.

In an operation 506, the method may include stopping the loop in response to the loop stopping condition being satisfied.

Online training phase: after r times of receptions and data acquisitions, the channel variation is beyond the generalization capability of the AI receiver. Although the channel decoding has an error correction capability, it is difficult to correctly recover a final information bitstream. Although the bit vector b_rc of each sample {y_r, b_rc} in the data set generated by previous r times of receptions is a bit vector which has been corrected through the channel decoding process and the channel coding process. In this case, an online small-step training fine tuning is performed for the AI receiver, such that a changed channel condition may be adapted in a next receiving period.

In the embodiments of the present disclosure, the method includes acquiring the second receiving signal; inputting the second signal into the first basic module and obtaining the fourth bitstream; performing the channel decoding process for the fourth bitstream and obtaining the fifth bitstream; performing the channel coding process for the fifth bitstream and obtaining the recoded sixth bitstream; and obtaining the third training set based on the sixth bitstream and the second receiving signal; performing the online training fine tuning process for the first basic model based on the third training set to obtain the second basic model, in response to the times of receiving the signals satisfying the reception time threshold; acquiring the third receiving signal; inputting the third receiving signal into the first basic model to obtain the tenth bitstream; preforming the channel decoding process for the tenth bitstream and obtaining the eleventh bitstream; performing the channel coding process for the eleventh bitstream and obtaining the recoded twelfth bitstream; and obtaining the sixth training set based on the twelfth bitstream and the third receiving signal; performing the online training fine tuning process for the first basic model based on the sixth training set to obtain the third basic model, in response to the times of receiving the signals satisfying the reception time threshold. In the embodiments of the present disclosure, the neural network module is configured to replace the function of the modular scheme in the traditional communication receiver. In particular, in the present disclosure, it is considered that the receiver in the actual application employs the online training learning method to enable the receiver module to be kept updated in real time or periodically based on the time-varying feature such as, the receiving bitstream feature, a channel feature, etc., which ensures the environmental tracking auto-adaptive adjustment of the model in the actual application, and improves the adaptation generalization capability. In this way, the reception recovery accuracy of the AI-based communication receiver for the information bitstream may be improved.

In some embodiments, in implementations as shown in FIG. 3 or FIG. 5, in terms of a selection of the module of the AI receiver, different data features or channel features may have different influence on the selection of the module of the AI receiver.

In some embodiments, the method includes online training for a part of network layers in the terminal device in response to the receiver including the terminal device; and online training for all or a part of network layers in the network device in response to the receiver including the network device.

Figures 6D, 7, 8:
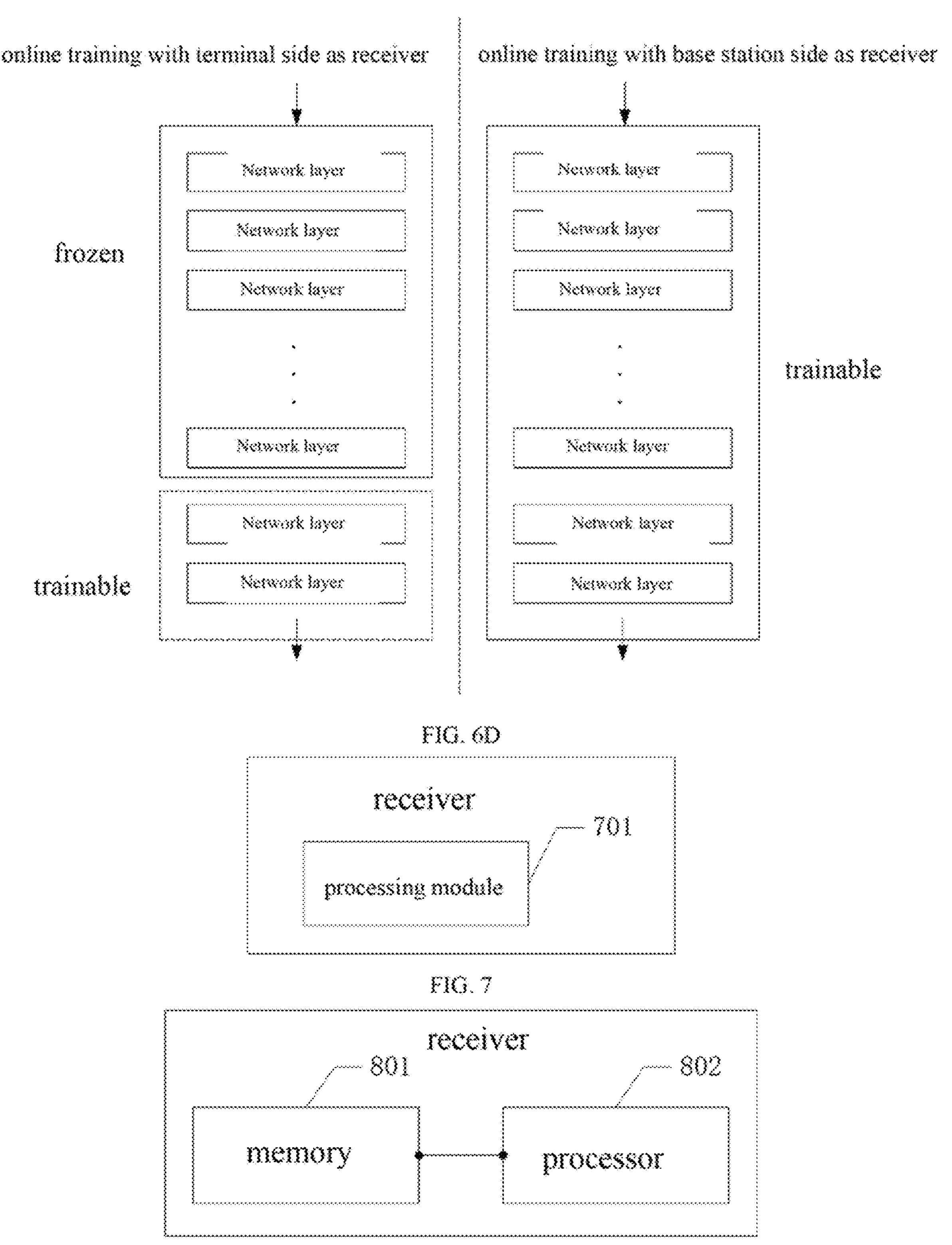
FIG. 6D is a schematic view of online training with a terminal side or a network side as a receiver according to some embodiments of the present disclosure.
FIG. 7 is a schematic view of a receiver according to some embodiments of the present disclosure.
FIG. 8 is another schematic view of the receiver according to some embodiments of the present disclosure.

For example, as shown in FIG. 6D, FIG. 6D is a schematic view of online training with a terminal side or a network side as a receiver according to some embodiments of the present disclosure.

That is, the model selection is required to be matched with a current data feature, etc., and be adjusted accordingly. In terms of an online training scheme, an online learning augmentation receiver in an uplink communication process and a downlink communication process may select different online training schemes based on actual situations.

Considering the uplink communication, a smart device terminal such as a mobile phone serves as the transmitter, while a base station serves as the receiver. Since a computing capability, a power consumption requirement, and data storage capability of the based station side are large, all network layers of a whole receiver module may be trained during online training.

Considering the downlink communication, the smart device such as the mobile phone serves as the receiver. Since limitations of the computing capability, a power consumption, a storage condition of the terminal, it may be considered to freeze most of feature extraction layers of the whole receiver model and only fine tune a part of the network layers during the online training fine tuning, which may relatively save resources, improve a training speed, and reduce an online learning and reception delay.

In terms of a scheme employing an online learning augmentation, in the actual application, other than variation in an information bitstream vector and a channel environment, the communication system also has other multiple factors to cause a feature of the receiving signal to be changed, such that a generalization performance of the receiver may be further affected. For example, since a function such as auto-adaptive coding, etc., a corresponding parameter of the transmitter such as a modulation manner, a coding manner, etc., may be changed accordingly, which leads the feature of the receiving signal may be changed. An action such as a movement, a switch, etc., of the terminal may lead to a change of a whole environment of different cells. As a computing power of the device continues to be improved, the auto-adaptive adjustment capability of the online learning to the model in short time will also be improved. In this way, the tracking and adapting performed by the receiver for a signal feature change through the online learning may also be extended to the change of a complex environment with more variables as mentioned above.

The present disclosure proposes a design method for an AI communication system augmented through the online learning, the AI receiver. The method considers to employ the neural network model to replace the function of the modular scheme in the traditional communication receiver. In particular, for a problem of a pretrained module having a low generalization capability for a complex environment variation in the actual application as a result of failing to learn in a basic pretraining due to an extremely large space spanned by training bitstream vectors and a change of a real channel condition, etc. The receiver is configured to perform the fine tuning training for the module in real time of periodically through the online learning in the reception in the actual application, such that the model is caused to continuously tracks and adapts the current reception environment to improve the reception recovery accuracy of the receiver for the receiving bitstream and augment the performance of the receiver.

As shown in FIG. 7, FIG. 7 is a schematic view of a receiver according to some embodiments of the present disclosure. The receiver may include a processing module 701.

The processing module 701 is configured to perform a data augmentation process for a result obtained by a first basic model of the receiver to obtain a first data augmented training set; perform an online training fine tuning process for the first basic model based on the first data augmented training set to obtain a second basic model; and stop a loop in response to a loop stopping condition being satisfied.

In some embodiments, the processing module 701 is further configured to perform the data augmentation process for a result obtained by the second basic model to obtain a second data augmented training set; and perform the online training fine tuning process for the second basic model based on the first data augmented training set to obtain a third basic model.

In some embodiments, the processing module 701 is configured to acquire a first receiving signal; input the first receiving signal into the first basic model of the receiver to obtain a first bitstream; perform the data augmentation process for the first bitstream to obtain a second bitstream; and perform the online training fine tuning process for the first basic model based on a second bitstream to obtain the second basic model.

In some embodiments, processing module 701 is configured to select a target bitstream from the first bitstream, perform a binary process for the target bitstream, and obtain a perturbation bit vector set; obtain a second training set based on the perturbation bit vector set and a receiving signal set, wherein the receiving signal set is obtained based on the perturbation bit vector set; and perform the online training fine tuning process for the first basic model based on the second training set to obtain the second basic model.

In some embodiments, the processing module 701 is further configured to input the first receiving signal into the second basic model to obtain a third bitstream; and stop the loop in response to a symbol error rate of the third bitstream being less than a preset symbol error rate threshold, and/or, the number of loops being equal to a preset number threshold.

In some embodiments, the processing module 701 is further configured to acquire a channel set; generate a source bitstream; obtain a receiving signal based on the channel set and the source bitstream; obtain a first training set based on the source bitstream and the receiving signal; and pretrain the first training set to obtain the first basic model.

In some embodiments, processing module 701 is further configured to acquire a second receiving signal; input the second receiving signal into the first basic model to obtain a fourth bitstream; perform a channel decoding process for the fourth bitstream to obtain a fifth bitstream; perform the channel coding process for the fifth bitstream to obtain a recoded sixth bitstream; obtain a third training set based on the sixth bitstream and the second receiving signal; and perform the online training fine tuning process for the first basic model based on third training set in response to times of receiving signals satisfying a receiving time threshold, to obtain the second basic model.

In some embodiments, processing module 701 is further configured to acquire a channel set; generate a source bitstream; perform a channel coding process for the source bitstream to obtain a coded bitstream; obtain a receiving signal based on the channel set and the coded bitstream; obtain a fourth training set based on the coded bitstream and the receiving signal; and pretrain the fourth training set to obtain the first basic model.

In some embodiments, the receiver comprises a terminal device or a network device.

In some embodiments, the processing module 701 is further configured to online train for a part of network layers in the terminal device in response to the receiver including the terminal device; and online train for all or a part of network layers in the network device in response to the receiver including the network device.

As shown in FIG. 8, FIG. 8 is another schematic view of the receiver according to some embodiments of the present disclosure.

The receiver may include a memory 801, storing executable program codes; and a processor, coupled to the memory.

The processor 802 is configured to perform a data augmentation process for a result obtained by a first basic model of the receiver to obtain a first data augmented training set; perform an online training fine tuning process for the first basic model based on the first data augmented training set to obtain a second basic model; and stop a loop in response to a loop stopping condition being satisfied.

In some embodiments, the processor 802 is further configured to perform the data augmentation process for a result obtained by the second basic model to obtain a second data augmented training set; and perform the online training fine tuning process for the second basic model based on the first data augmented training set to obtain a third basic model.

In some embodiments, the processor 802 is configured to acquire a first receiving signal; input the first receiving signal into the first basic model of the receiver to obtain a first bitstream; perform the data augmentation process for the first bitstream to obtain a second bitstream; and perform the online training fine tuning process for the first basic model based on a second bitstream to obtain the second basic model.

In some embodiments, processor 802 is configured to select a target bitstream from the first bitstream, perform a binary process for the target bitstream, and obtain a perturbation bit vector set; obtain a second training set based on the perturbation bit vector set and a receiving signal set, wherein the receiving signal set is obtained based on the perturbation bit vector set; and perform the online training fine tuning process for the first basic model based on the second training set to obtain the second basic model.

In some embodiments, the processor 802 is further configured to input the first receiving signal into the second basic model to obtain a third bitstream; and stop the loop in response to a symbol error rate of the third bitstream being less than a preset symbol error rate threshold, and/or, the number of loops being equal to a preset number threshold.

In some embodiments, the processor 802 is further configured to acquire a channel set; generate a source bitstream; obtain a receiving signal based on the channel set and the source bitstream; obtain a first training set based on the source bitstream and the receiving signal; and pretrain the first training set to obtain the first basic model.

In some embodiments, processor 802 is further configured to acquire a second receiving signal; input the second receiving signal into the first basic model to obtain a fourth bitstream; perform a channel decoding process for the fourth bitstream to obtain a fifth bitstream; perform the channel coding process for the fifth bitstream to obtain a recoded sixth bitstream; obtain a third training set based on the sixth bitstream and the second receiving signal; and perform the online training fine tuning process for the first basic model based on third training set in response to times of receiving signals satisfying a receiving time threshold, to obtain the second basic model.

In some embodiments, processor 802 is further configured to acquire a channel set; generate a source bitstream; perform a channel coding process for the source bitstream to obtain a coded bitstream; obtain a receiving signal based on the channel set and the coded bitstream; obtain a fourth training set based on the coded bitstream and the receiving signal; and pretrain the fourth training set to obtain the first basic model.

In some embodiments, the receiver comprises a terminal device or a network device.

In some embodiments, the processor 802 is further configured to online train for a part of network layers in the terminal device in response to the receiver including the terminal device; and online train for all or a part of network layers in the network device in response to the receiver including the network device.

The above embodiments may be achieved in whole or in part through a software, a hardware, a firmware, or any combination thereof. When implemented by the software, it may be implemented in whole or in part in a form of a computer program product. The computer program product includes one or more computer instructions. When the computer instructions are loaded and executed in a computer, a flow or function described in accordance with the embodiments of the present disclosure is generated in whole or in part. The computer may be a general-purpose computer, a specialized computer, a computer network, or other programmable devices. The computer instructions may be stored in a computer-readable storage medium or transmitted from one computer-readable storage medium to another computer-readable storage medium. For example, the computer instructions may be transmitted from a website site, a computer, a server, or a data center to another website site, another computer, another server, or another data center in a wired manner (e.g., a coaxial cable, a fiber optic, and a digital subscriber line (DSL)) or a wireless manner (e.g., infrared, wireless, microwave, etc.). The computer-readable storage medium may be any available medium storable in the computer or a data storage device such as the server, the data center, etc., integrated by one or more available media. The available medium may be a magnetic medium (e.g., a floppy disk, a hard disk, a magnetic tape), an optical medium (e.g., DVD), or a semiconductor medium (e.g., a Solid State Disk (SSD)), etc.

Terms “first”, “second”, “third”, and “fourth”, etc. in the specification and claims of the present disclosure and in the accompanying drawings above (when existing therein) are configured to distinguish similar objects and are not necessary to be configured to describe a particular order or sequence. It should be understood that features with these terms mentioned above may be interchangeable in an appropriate case, such that the embodiments described herein may be implemented in an order other than that illustrated or described herein. In addition, the terms “include” and “comprise” and any variations thereof are intended to cover non-exclusive inclusion. For example, a process, method, system, product, or apparatus including a series of steps or units are not necessary to be limited to those steps or units which are clearly listed, but may include those steps or units which are not clearly listed, or other steps or units inherent to the above process, method, product, or device.

What is claimed is:

1. A data augmentation method, wherein the method is performed by a receiver and comprises:

performing a data augmentation process for a result obtained by a first basic model of the receiver to obtain a first data augmented training set;

performing an online training fine tuning process for the first basic model based on the first data augmented training set to obtain a second basic model; and stopping a loop in response to a loop stopping condition being satisfied;

wherein the performing a data augmentation process for a result obtained by a first basic model of the receiver to obtain a first data augmented training set comprises:

acquiring a first receiving signal;

inputting the first receiving signal into the first basic model of the receiver to obtain a first bitstream; and performing the data augmentation process for the first bitstream to obtain a second bitstream;

wherein the performing an online training fine tuning process for the first basic model based on the first data augmented training set to obtain a second basic model comprises:

performing the online training fine tuning process for the first basic model based on a second bitstream to obtain the second basic model;

wherein the performing the data augmentation process for the first bitstream to obtain a second bitstream comprises:

selecting a target bitstream from the first bitstream, performing a binary process for the target bitstream, and obtaining a perturbation bit vector set; and obtaining a second training set based on the perturbation bit vector set and a receiving signal set, wherein the receiving signal set is obtained based on the perturbation bit vector set;

wherein the performing the online training fine tuning process for the first basic model based on a second bitstream to obtain the second basic model comprises:

performing the online training fine tuning process for the first basic model based on the second training set to obtain the second basic model;

wherein the method further comprises:

inputting the first receiving signal into the second basic model to obtain a third bitstream;

wherein the stopping a loop in response to a loop stopping condition being satisfied comprises:

stopping the loop in response to a symbol error rate of the third bitstream being less than a preset symbol error rate threshold, and/or, the number of loops being equal to a preset number threshold.

2. The method according to claim 1, wherein after the performing an online training fine tuning process for the first basic model based on the first data augmented training set to obtain a second basic model and before the stopping a loop in response to a loop stopping condition being satisfied, the method further comprises:

performing the data augmentation process for a result obtained by the second basic model to obtain a second data augmented training set; and performing the online training fine tuning process for the second basic model based on the first data augmented training set to obtain a third basic model.

3. The method according to claim 1, further comprising:

acquiring a channel set;

generating a source bitstream;

obtaining a receiving signal based on the channel set and the source bitstream;

obtaining a first training set based on the source bitstream and the receiving signal; and pretraining the first training set to obtain the first basic model.

4. The method according to claim 1, wherein the performing a data augmentation process for a result obtained by a first basic model of the receiver to obtain a first data augmented training set comprises:

acquiring a second receiving signal;

inputting the second receiving signal into the first basic model to obtain a fourth bitstream;

performing a channel decoding process for the fourth bitstream to obtain a fifth bitstream;

performing the channel coding process for the fifth bitstream to obtain a recoded sixth bitstream; and obtaining a third training set based on the sixth bitstream and the second receiving signal;

wherein the performing an online training fine tuning process for the first basic model based on the first data augmented training set to obtain a second basic model comprises:

performing the online training fine tuning process for the first basic model based on third training set in response to times of receiving signals satisfying a reception time threshold, to obtain the second basic model.

5. The method according to claim 4, further comprising:
acquiring a channel set;
generating a source bitstream;
performing a channel coding process for the source bitstream to obtain a coded bitstream;
obtaining a receiving signal based on the channel set and the coded bitstream;
obtaining a fourth training set based on the coded bitstream and the receiving signal; and
pretraining the fourth training set to obtain the first basic model.

6. The method according to claim 1, wherein the receiver comprises a terminal device or a network device.

7. The method according to claim 6, further comprising:
online training for a part of network layers in the terminal device in response to the receiver comprising the terminal device; and
online training for all or a part of network layers in the network device in response to the receiver comprising the network device.

8. A receiver, comprising:
a memory, storing executable program codes; and
a processor, coupled to the memory;
wherein the processor is configured to:
perform a data augmentation process for a result obtained by a first basic model of the receiver to obtain a first data augmented training set;
perform an online training fine tuning process for the first basic model based on the first data augmented training set to obtain a second basic model; and
stop a loop in response to a loop stopping condition being satisfied;
wherein the performing a data augmentation process for a result obtained by a first basic model of the receiver to obtain a first data augmented training set comprises:
acquiring a first receiving signal;
inputting the first receiving signal into the first basic model of the receiver to obtain a first bitstream; and
performing the data augmentation process for the first bitstream to obtain a second bitstream;
wherein the performing an online training fine tuning process for the first basic model based on the first data augmented training set to obtain a second basic model comprises:
performing the online training fine tuning process for the first basic model based on a second bitstream to obtain the second basic model;
wherein the performing the data augmentation process for the first bitstream to obtain a second bitstream comprises:
selecting a target bitstream from the first bitstream, performing a binary process for the target bitstream, and obtaining a perturbation bit vector set; and
obtaining a second training set based on the perturbation bit vector set and a receiving signal set, wherein the receiving signal set is obtained based on the perturbation bit vector set;
wherein the performing the online training fine tuning process for the first basic model based on a second bitstream to obtain the second basic model comprises:
performing the online training fine tuning process for the first basic model based on the second training set to obtain the second basic model;
wherein the processor is further configured to:
input the first receiving signal into the second basic model to obtain a third bitstream; and
stop the loop in response to a symbol error rate of the third bitstream being less than a preset symbol error rate threshold, and/or, the number of loops being equal to a preset number threshold.

9. The receiver according to claim 8, wherein the processor is further configured to:
perform the data augmentation process for a result obtained by the second basic model to obtain a second data augmented training set; and
perform the online training fine tuning process for the second basic model based on the first data augmented training set to obtain a third basic model.

10. The receiver according to claim 8, wherein the processor is further configured to:
acquire a channel set;
generate a source bitstream;
obtain a receiving signal based on the channel set and the source bitstream;
obtain a first training set based on the source bitstream and the receiving signal; and
pretrain the first training set to obtain the first basic model.

11. The receiver according to claim 8, wherein the processor is further configured to:
acquire a second receiving signal;
input the second receiving signal into the first basic model to obtain a fourth bitstream;
perform a channel decoding process for the fourth bitstream to obtain a fifth bitstream;
perform the channel coding process for the fifth bitstream to obtain a recoded sixth bitstream;
obtain a third training set based on the sixth bitstream and the second receiving signal; and
perform the online training fine tuning process for the first basic model based on third training set in response to times of receiving signals satisfying a receiving time threshold, to obtain the second basic model.

12. The receiver according to claim 11, wherein the processor is further configured to:
acquire a channel set;
generate a source bitstream;
perform a channel coding process for the source bitstream to obtain a coded bitstream;
obtain a receiving signal based on the channel set and the coded bitstream;
obtain a fourth training set based on the coded bitstream and the receiving signal; and
pretrain the fourth training set to obtain the first basic model.

13. The receiver according to claim 8, comprising a terminal device or a network device.

14. The receiver according to claim 13, wherein processor is further configured to:
online train for a part of network layers in the terminal device in response to the receiver comprising the terminal device; and
online train for all or a part of network layers in the network device in response to the receiver comprising the network device.

* * * * *